US007033211B2

(12) United States Patent
Bartholomä et al.

(10) Patent No.: US 7,033,211 B2
(45) Date of Patent: Apr. 25, 2006

(54) ELECTRICAL ANGULAR PIN-AND-SOCKET CONNECTOR WITH MUTUAL FIXATION OF BOTH ANGULAR SIDES

(75) Inventors: Mario Bartholomä, Winden (DE); Achim Hoch, Waldkirch (DE); Frank Köhler, Buchholz-Batzenhäusle (DE); Manfred Stratz, Simonswald (DE); Günter Reich, Elzach (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 120 days.

(21) Appl. No.: 10/497,121

(22) PCT Filed: Apr. 2, 2003

(86) PCT No.: PCT/EP03/03436

§ 371 (c)(1),
(2), (4) Date: May 26, 2004

(87) PCT Pub. No.: WO03/088423

PCT Pub. Date: Oct. 23, 2003

(65) Prior Publication Data

US 2005/0085117 A1 Apr. 21, 2005

(30) Foreign Application Priority Data

Apr. 12, 2002 (DE) ................................ 102 16 406

(51) Int. Cl.
*H01R 13/73* (2006.01)
*H02B 1/01* (2006.01)

(52) U.S. Cl. ........................ 439/572; 439/902; 439/903

(58) Field of Classification Search ................ 572/572, 572/573, 686, 902, 903, 906, 79
See application file for complete search history.

(56) References Cited

U.S. PATENT DOCUMENTS 2,801,395 A * 7/1957 Quackenbush .............. 439/589

FOREIGN PATENT DOCUMENTS

| | | |
|---|---|---|
| DE | 91 01 045.4 | 7/1992 |
| DE | 19 748 419 | 5/1998 |
| DE | 10 106 153 | 9/2001 |
| EP | 0 411 239 | 2/1991 |

* cited by examiner

*Primary Examiner*—Javaid H. Nasri
(74) *Attorney, Agent, or Firm*—Volpe and Koenig, P.C.

(57) ABSTRACT

An electrical angular pin-and-socket connector (1) is provided which includes two individual, separate angle legs (2) and (5). The second angle leg (5) includes a receiving opening (8) which opens perpendicularly to the profile of the angle leg, and in which a plug-in section (9) of the first angle leg (2) can be plugged and fitted, the two angle legs (2) and (5) being intermated in a functional position. In order to mutually lock the two angle legs in the functional position, an opening (10) extending perpendicularly to the axial extension of the first angle leg (2) is created through the second angle leg (5), in the cover or contact region inside the receiving opening (8), and part of the cross-section of the opening is respectively present in the contact region of the two angle legs, in such a way that a fixing screw (6) passing through the opening (10) or borehole positively grips the two angle legs and mutually locks the same.

10 Claims, 1 Drawing Sheet

ELECTRICAL ANGULAR PIN-AND-SOCKET CONNECTOR WITH MUTUAL FIXATION OF BOTH ANGULAR SIDES

BACKGROUND

The invention relates to an electrical angle-shaped pin-and-socket connector with an insulating body, which contains electrical contacts and which is arranged and fixed in the functional position in a first angle leg of this pin-and-socket connector. The lines going out from the insulating body and the electrical contacts extend through a second angle leg of the pin-and-socket connector to a load or to a power source behind a wall, e.g., in a housing, on which the second angle leg in the functional position is held directly or indirectly with at least one attachment screw. An attachment screw for the pin-and-socket connector is simultaneously used for mutual fixation of the two angle legs in the functional position.

Such a pin-and-socket connector is known from DE 101 06 153 A1 and has been proven effective in practice. One advantage for this previously known pin-and-socket connector is that, for the use of a total of four attachment screws to mount the connector on the wall of a housing, two attachment screws are simultaneously used to fix the first angle leg, which can move relative to the second angle leg, namely in a pivoting motion, in its functional position extending at an angle to the second angle leg. For this angular pin-and-socket connector, a connection in the form of a hinge projecting past the outline is also provided on the outside of the angle formed by the two angle legs in order to rigidly connect the angle legs to each other, wherein the legs are flush to each other in the functional position.

The arrangement of such a hinge increases the production and assembly costs and also forms a projection, which can be disruptive to the spatial requirements and arrangement, relative to the actual pin-and-socket connector.

SUMMARY

Therefore, there is the objective of creating a pin-and-socket connector of the type mentioned in the introduction, for which the advantage remains that the first angle leg can be connected and locked to the second angle leg with the help of at least one of the attachment screws for the entire pin-and-socket connector, wherein an additional connection point in the form of a hinge is to be avoided.

To meet this objective, the pin-and-socket connector mentioned in the introduction is characterized in that the second angle leg has a receptacle opening, which opens perpendicular to an extension direction of the leg, and in which a plug section of the first angle leg can be inserted and fitted, and that in the overlapping or contact area of the inner side of the receptacle opening of the second leg with the plug section of the first angle leg, there is an opening perpendicular to the axial extension of the first angle leg through the second angle leg up to a surface on the wall for receiving an attachment screw, which extends into the contact area with a part of its cross section approximately as a secant at least through a part of the cross section of the wall of the plug section of the first angle leg, so that in the functional position the attachment screw extending through this continuous opening simultaneously runs through the plug section and fixes the first angle leg in a positive fit in the axial direction.

Therefore, it is possible, with the help of an attachment screw, which can be screwed into the wall of a machine housing or the like, to simultaneously attach the pin-and-socket connector and to grip the contact or attachment area of the first angle leg to its plug section and to fix and lock this area in a positive fit in the axial direction, without significantly affecting the inner cross section or the inner longitudinal hollow space of the first angle leg in a negative way by the perpendicular screw. This avoids a hinge projecting on the outside in the angle region of the pin-and-socket connector. Consequently, the two angle legs can also be separated from each other again.

It is especially favorable if in the contact region of the receptacle opening of the second angle leg, there are two parallel, continuous openings for attachment screws, which engage with a part of their cross section in the wall of the plug section of the first angle leg in the functional position and if two attachment screws gripping the first angle leg in the functional position are provided. The first angle leg is fixed correspondingly tight and secure in the second angle leg by the assembly of the entire pin-and-socket connector on a housing wall. Here, the two attachment screws can extend parallel to each other and can engage in corresponding recesses of its wall at two opposing positions of the plug section.

In addition to the attachment screw(s) fixed to the first angle leg in the functional position, at least one other opening or bore hole can be provided for at least one other attachment screw on the second angle leg outside of the connection region with the first angle leg. In many cases, it is desirable to fix such a pin-and-socket connector with a total of four screws, which also corresponds to the hole pattern according to DE 101 06 153.6 A1, so that the pin-and-socket connector according to the invention also fits in positions, where known pin-and-socket connectors were previously provided.

The second angle leg can have a cube or right parallelepiped external shape, wherein a side surface can have the receptacle opening for the first angle leg. This simplifies the production, because the second angle leg can be cold-formed or hot-formed with its very simple geometric shape, e.g., with a forging die. The receptacle opening for the first angle leg and the opening connected in the interior of the second angle leg for the electrical cable can be worked in very easily, e.g., with the help of drills or milling cutters into such a cube or right parallelepiped. Here, it is advantageous that the two angle legs can be fit together easily for their assembly, in order to avoid possibly mutual rotational or pivoting motions for assembly, for which the cable is already connected to the insulating body located in the first angle leg.

The attachment screws can have, on one hand, a screw head which contacts the second angle leg and, on the other hand, a thread, which matches an opposite thread in the wall or a nut or similar counter-piece located behind this wall. The entire assembly and attachment of the pin-and-socket connector, which simultaneously leads to the fixing of the first angle leg to the second angle leg, is correspondingly easy.

The continuous openings for the attachment screws can be bore holes. Their production is correspondingly easy.

The portion of the continuous opening or bore hole for the attachment screw(s) can at least partially penetrate the receptacle wall for simultaneous locking of the first angle leg at its plug section and can form a slot running perpendicular to the axial extent of this first angle leg, if necessary passing through the wall. Thus, the best possible use of the thickness of the wall of this plug section can be realized for locking the first angle leg to the second angle leg, without the attachment screw significantly engaging in the inner cross section of the first angle leg.

Adjacent to the bore hole or slot region in the axial direction, on the plug section there can be on the first angle leg a stop, which limits the insertion depth of the plug section relative to the second angle leg in the functional position. This stop can have a distance from the bore hole or slot region such that a seal fits in-between, with which the two angle legs are sealed against each other in the functional position. Thus, in an advantageous way, the bore hole or slot region on the plug section includes a sufficient distance for a seal from the stop of the first angle leg, which represents a cross-sectional enlargement relative to the plug section, so that the two angle legs can be sealed against each other.

Here, the seal on the stop of the first angle leg can be a seal, especially an O-ring, whose elasticity is also used to compensate for axial tolerances. The seal thus provides a dual function.

So that the first angle leg, which in a preferred embodiment extends perpendicular to the second angle leg, has a sufficient distance from the wall of the housing, it is advantageous when the receptacle opening on the second angle leg opposite its contact surface that can be connected to the wall has a greater distance than from the end of this angle leg at a distance from the wall and is arranged in a side surface of the second angle leg running at an angle to this wall in the functional position. Thus, the second angle leg projects only slightly past the plug region on the side facing away from the wall and the contact surface.

Above all, combining individual or several of the previously described features and measures produces an electrical angular pin-and-socket connector, which is formed of a few parts, wherein the actual separate angle legs are mutually fixed and locked simultaneously by fixing the pin-and-socket connector to a housing.

BRIEF DESCRIPTION OF THE DRAWINGS

In the following, an embodiment of the invention is described in more detail with reference to the drawing. Shown in a partially schematic diagram.

DETAILED DESCRIPTION OF THE PREFERRED EMBODIMENTS

Figure 1:
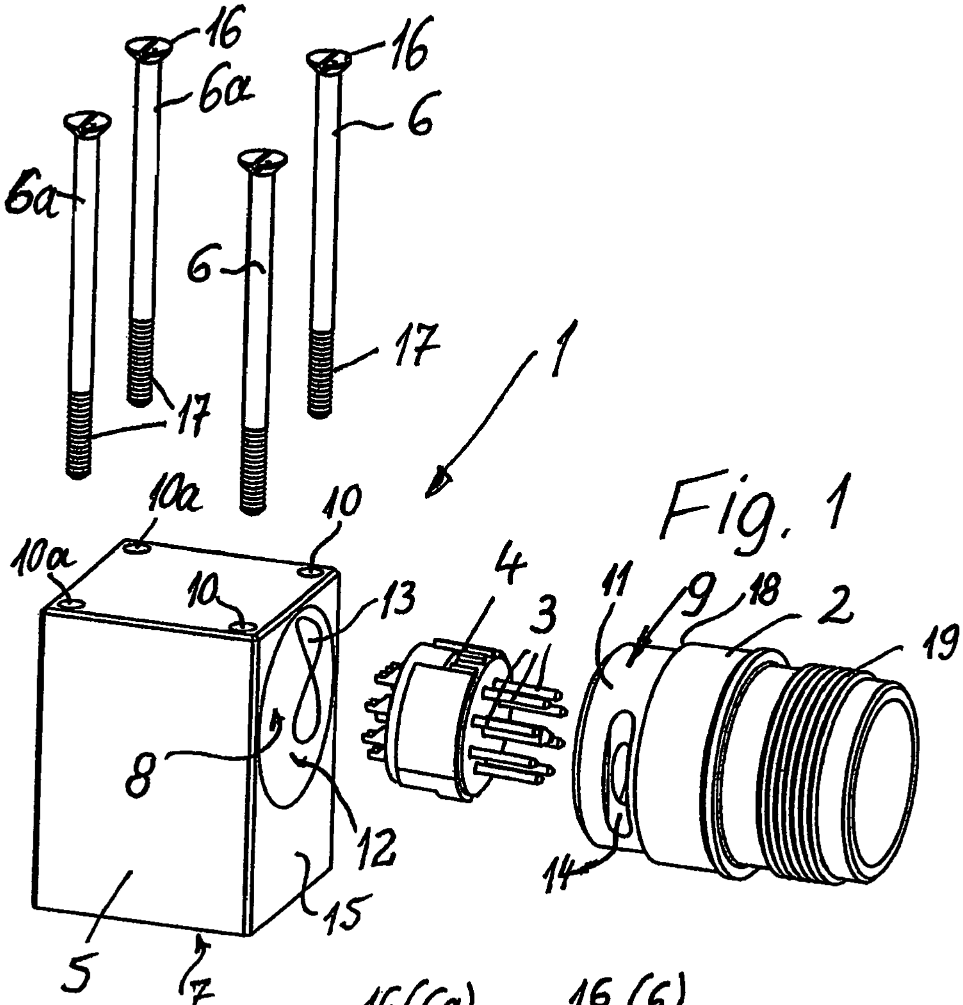
FIG. 1 is an exploded view of the pin-and-socket connector with the two angle legs and the insulating body, as well as the attachment screws before assembly.

An electrical angle-shaped pin-and-socket connector designated in the drawings as 1, has a first angle leg 2, which in the functional position accommodates inside itself an insulating body 4 containing electrical contacts 3, in the embodiment contact pins, but also, if necessary, contact sockets. The lines or wires, which go out from the insulating body 4 and the electrical contacts 3 and which are not shown in the drawing for reasons of clarity, run through a second angle leg 5 of the plug connector 1 to a load or to a power source, which is located behind a wall, e.g., of a housing, on which the second angle leg 5 is held in the functional position with at least one attachment screw 6 directly or indirectly, so that a lower contact surface 7 in the drawing contacts such a wall, optionaly with a seal in-between. In FIG. 1, the course of the attachment screws 6 for the functional position can be recognized, which run perpendicular to such a wall of the housing and can be screwed into this wall.

In addition to an inner hollow space running parallel to the attachment screws for the electrical cable, the second angle leg 5 has a receptacle opening 8, which opens perpendicular an extension direction of the lag 5 and to its inner hollow space, and in which a plug section 9 of the first angle leg 2 can be inserted and fitted. In FIG. 1 it is shown that in the overlapping or contact region of the inner side of the receptacle opening 8 of the second angle leg 5 with this plug section 9 of the first angle leg 2, a continuous opening 10 perpendicular to the axial extension of the first angle leg is provided through the second angle leg 5 up to a contact surface 7 on the wall for receiving an attachment screw 6.

Here, it is shown in FIG. 1 that this continuous opening 10 runs in the contact region with a part of its cross section approximately as a secant, on one hand, at least through a portion of the cross section of the wall 11 of the plug section 9 of the first angle leg and, on the other hand, through the limit 12 of the receptacle opening 8 of the second angle leg 5, so that the attachment screw 6 running in the functional position through this continuous opening 10 divided in the plug region runs simultaneously through the plug section 9 and the receptacle opening 8 and is fixed in its mutual end or contact region and the first angle leg 2 in the axial direction in a positive fit on the second angle leg 5. FIG. 1 shows schematically the cut 13 of the opening 10 with an inner surface of the receptacle opening 8 on one side and also a cut 14 in the form of a slot on the plug section 9 or in its wall 11. In the assembled position, these two cuts 13 and 14 overlap such that the screw 6 runs through both cuts and mutually fixes them.

It can be further seen in FIG. 1 that in the contact region of the receptacle opening 8 of the second angle leg 5, there are two parallel continuous openings 10 for attachment screws 6, with which a portion of their cross section engages in the wall 11 of the plug section 9 of the first angle leg 2 in the functional position. Accordingly, for this purpose there are two attachment screws 6 gripping the first angle leg 2, which leads to a secure and symmetrical locking of the first angle leg 2 on the second angle leg 5.

In addition to the attachment screws 6 locking the first angle leg 2 in the functional position to the second angle leg 5, two other openings 10*a* or bore holes can be seen on the second angle leg 5 outside of the connection region with the first angle leg 2 for additional attachment screws 6*a*, which are used exclusively for better fixation of the pin-and-socket connector 1 to a wall. Here, however, the screws 6 and 6*a* can be formed equally, which simplifies the assembly and also the production, wherein at least the screws 6*a* can be sealed, e.g., by means of an O-ring.

The second angle leg 5 has a cubic or right parallelepiped external shape, wherein one side surface 15 has the receptacle opening 8 for the first angle leg 2. One such part can be formed simply and can thus also be manufactured from high-quality material, e.g., from stainless steel.

According to FIG. 1, the attachment screws 6 and 6*a* have on one side a screw head 16 attached at the top to the second angle leg 5 and on the other side a thread 17, which fits a counter thread in the wall or a nut or similar counter-piece located behind such a wall of a housing, on which the pin-and-socket connector 11 is attached. Here, the continuous openings 10 and 10*a* are formed as bore holes.

In the embodiment, the portion of the continuous opening 10 or bore hole for the attachment screws 6 partially penetrates its wall 11 for simultaneous locking of the first angle leg 2 on its plug section 9 and forms a continuous slot, which runs perpendicular to the axial extent of this first angle leg, in the embodiment also passing approximately through the wall 11, and which corresponds to the already mentioned cutting 14 of the bore hole 10 with the plug section 9. The slot that can be seen in FIG. 1 is also provided on the opposite side of this angle leg 2 in the embodiment in an analogous and symmetrical way. The attachment screws 6 thus grip in the functional position practically the entire cross section of the wall 11 of the plug section 9, which leads to the best possible locking, wherein a negligible part of the cross section of the attachment screws 6 engages into the inner longitudinal hollow space of the angle leg 2, which therefore still has sufficient space.

Adjacent to this contact or slot region of the cutting 14 in the axial direction, there is a stop 18, which projects in the radial direction on the first angle leg 2, thus its plug section 9, and which limits the insertion depth of the plug section 9 relative to the second angle leg 5 in the functional position. Here, this stop 18 has a distance from the bore hole or slot region such that a seal, which is not shown in more detail, is fitted in-between and with which the two angle legs are mutually sealed in the functional position. Due to its elasticity, this sealing ring can also be used simultaneously to compensate for axial tolerances.

Figure 2:
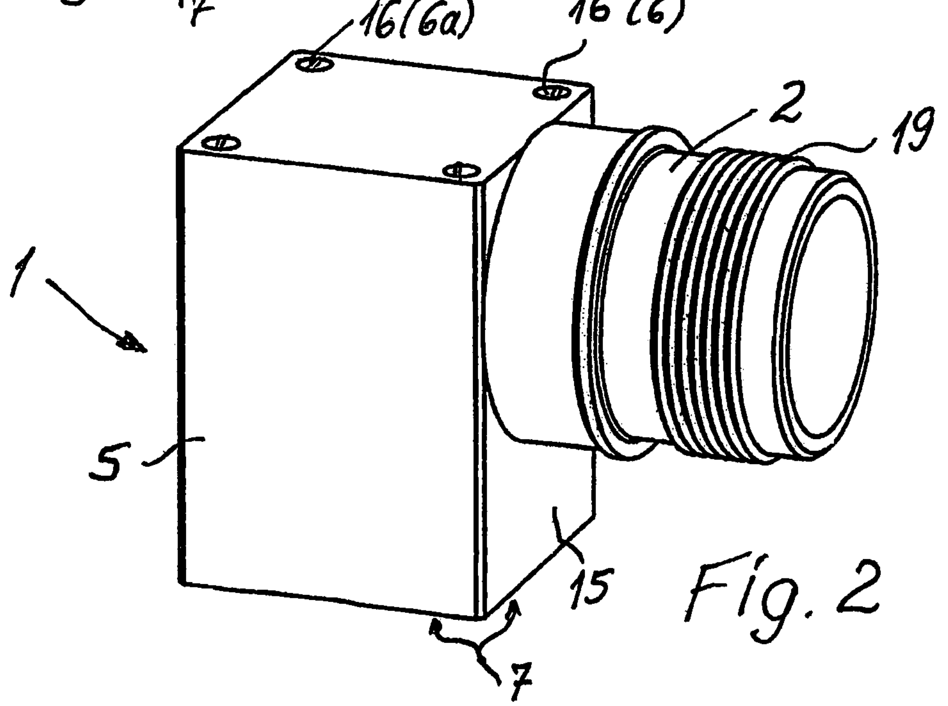
FIG. 2 is a view of the pin-and-socket connector in the functional position, wherein the wall, to which the pin-and-socket connector can be attached with the help of the attachment screws, is not shown.

In both figures, it can be seen that the receptacle opening 8 on the second angle leg 5 relative to its contact surface 7 that can be connected to a wall has a greater distance than from the end of this angle leg at a distance from the wall and is arranged in the side surface 15 running in the functional position at an angle to this wall. This produces the angular pin-and-socket connector according to FIG. 2 in the assembled position, for which the first angle leg 2 relative to a housing wall has a corresponding distance to attach, e.g., a counter plug, or to enable an assembly on an external thread 19 provided on the leg.

The electrical angular pin-and-socket connector 1 has two individually separate angle legs 2 and 5, wherein the second angle leg 5 has a receptacle opening 8, which opens perpendicular to its extent and in which a plug section 9 of the first angle leg 2 can be inserted and fitted, i.e., the two angle legs 2 and 5 are fit together in the functional position. For the mutual locking of the two angle legs in the functional position, in the overlapping or contact region within the receptacle opening 8 there is a continuous opening 10, which runs perpendicular to the axial extent of the first angle leg 2 through the second angle leg 5 and which in the contact region of each of the two angle legs is present at a part of its cross section on one side on the first and on the other hand on the other angle leg, so that a continuous attachment screw 6 through this opening 10 or bore hole grips both angle legs in a positive fit and mutually locks them.

What is claimed is:

1. An electrical angle-shaped pin-and-socket connector comprising:

an insulating body, which contains electrical contacts and which is arranged and fixed in a functional position in a first angle leg of the pin-and-socket connector such that electrical lines can extend out from the insulating body;

the electrical contacts extend through a second angle leg of the pin-and-socket connector to a load or to a power source behind a wall of a housing, on which the second angle leg is adapted to be held directly or indirectly in the functional position with at least one attachment screw;

the at least one attachment screw of the pin-and-socket connector is simultaneously used for mutual fixation of the two angle legs in the functional position;

the second angle leg having a receptacle opening, which opens perpendicular to an extension direction of the second angle leg and in which a plug section of the first angle leg is inserted and fitted; and an overlapping or contact region between an inside of the receptacle opening of the second angle leg and the plug section of the first angle leg includes at least one continuous opening therethrough, arranged perpendicular to an axial extension direction of the first angle leg through the second angle leg, the at least one continuous opening extending to a contact surface on the wall for receiving the attachment screw, the attachment screw extends into the overlapping or contact region with a part of a cross section thereof approximately as a secant at least through a part of the cross section of a wall of the plug section of the first angle leg, so that the attachment screw, extending in the functional position through the continuous opening, simultaneously extends through the plug section and fixes the first angle leg in the axial direction with a positive fit.

2. The connector according to claim 1, wherein in the overlapping or contact region of the receptacle opening of the second angle leg there are two parallel continuous openings for receiving two screws, which each engage a respective part of the cross section in the wall of the plug section of the first angle leg in the functional position and there are two attachment screws gripping the first angle leg in the functional position.

3. The connector according to claim 1, further comprising at least one other continuous opening in the second angle leg for at least one other attachment screw outside of the contact region with the first angle leg.

4. The connector according to claim 1, wherein the second angle leg has a cubic or right parallelepiped external shape, and a side surface includes the receptacle opening for the first angle leg.

5. The connector according to claim 3, wherein the at least one attachment screw and the at least one other attachment screw have a screw head on one end for contacting the second angle leg and a thread on the other end, which is adapted to fit one of a counter thread in the wall, a nut or a counter-piece located behind the wall.

6. The connector according to claim 3, wherein the at least one continuous opening and the at least one other continuous opening are bore holes.

7. The connector according to claim 1, wherein a portion of the at least one continuous opening for the at least one attachment screw for simultaneous locking of the first angle leg via the plug section at least partially penetrates the wall thereof and forms a continuous slot perpendicular to the axial extension direction of the first angle leg.

8. The connector according to claim 1, wherein in the axial direction adjacent to a bore hole or slot region on the plug section there is a stop on the first angle leg, which limits, in the functional position, an insertion depth of the plug section relative to the second angle leg, and the stop is set at a distance from the bore hole or slot region such that a seal fits in-between, with which the two angle legs are sealed against each other in the functional position.

9. The connector according to claim 8, wherein the seal is an O-ring, having an elasticity which is also used to compensate for axial tolerances.

10. The connector according to claim 1, wherein the receptacle opening is located on a side surface of the second angle leg at a greater distance from the wall relative to a distance from the at least one continuous opening and the receptacle opening extends at an angle to the wall in the functional position.

* * * * *